United States Patent [19]

McWilliams

[11] 4,365,135

[45] Dec. 21, 1982

[54] SHAPING OF THERMAL INSULATION MATERIAL

[75] Inventor: Joseph A. McWilliams, Droitwich, England

[73] Assignee: Micropore International Ltd., England

[21] Appl. No.: 215,092

[22] Filed: Dec. 10, 1980

[30] Foreign Application Priority Data

Dec. 14, 1979 [GB] United Kingdom ............... 7943116

[51] Int. Cl.³ ............................................. B23K 26/00
[52] U.S. Cl. ..................... 219/121 LF; 219/121 LN; 219/121 LU; 427/12; 427/53.1; 428/409; 156/272.8
[58] Field of Search ..... 219/121 L, 121 LM, 121 LE, 219/121 LF; 427/12, 53, 289, 207 R; 428/321, 192, 194, 409; 106/40 R; 52/408

[56] References Cited

U.S. PATENT DOCUMENTS 4,151,014 4/1979 Charschan et al. .......... 219/121 LF
4,234,637 11/1980 Sewell et al. ................ 219/121 LM

FOREIGN PATENT DOCUMENTS 1433478 4/1976 United Kingdom ............... 428/409

Primary Examiner—M. H. Paschall
Attorney, Agent, or Firm—Allegretti, Newitt, Witcoff & McAndrews

[57] ABSTRACT

The invention relates to the formation of a protective skin on blocks of microporous thermal insulation material. Such material is difficult to protect because the securement of a protective layer by some form of adhesive securement provides only a relatively loose bond. According to the invention, a laser beam is used to fuse a surface layer of particles in the material to form a protective skin. The beam may be passed over an otherwise "raw" edge of a block of material, or used also to cut the block from a workpiece while simultaneously forming the skin. This enables the cutting of accurate shapes either by manual or automatic control of the passage of the beam through the workpiece, the latter much facilitating mass production of relatively complicated shapes.

8 Claims, 5 Drawing Figures

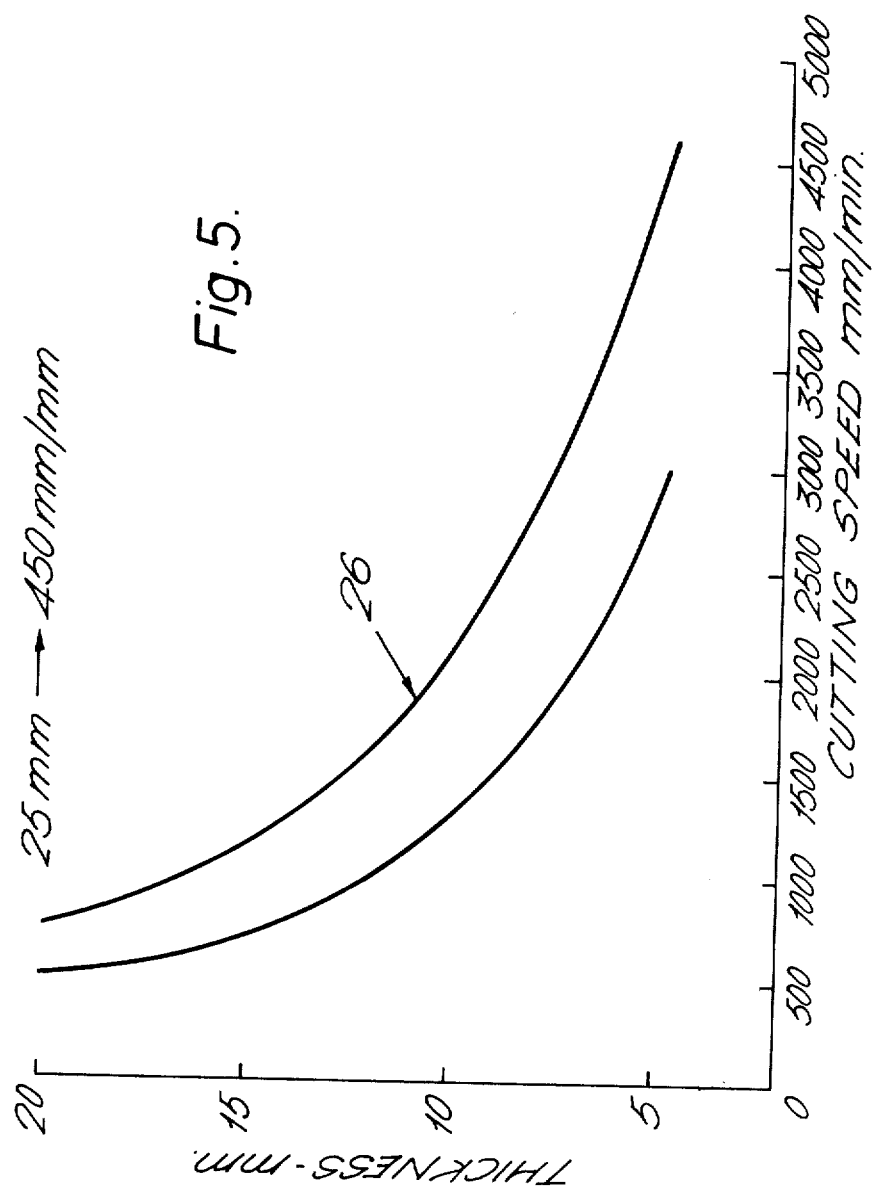

SHAPING OF THERMAL INSULATION MATERIAL

BACKGROUND OF THE INVENTION

This invention relates to the formation of a protective skin on blocks of microporous thermal insulation material, particularly to such blocks having complicated shapes and which have surfaces which are not to be protected in use.

A microporous thermal insulation is known which comprises silica-aerogel particles, an opacifier and fibre reinforcement, in a dry mix which is compacted to form a handleable block of material. Such materials and methods for its manufacture are disclosed in British Pat. Nos.: 1,205,572; 1,433,478; and 1,580,909, to which reference is directed. These materials are marketed by Micropore International Limited and its associated companies under the Trade Name MICROTHERM. Typically, the density of a block of MICROTHERM material is around 240 kg/m$^3$. This material has excellent insulation properties but is of a powdery consistency and as a consequence, is often used with a cover layer of for example, fibreglass, to protect it from damage during normal handling. For some purposes, the material can be compressed in a porous envelope as described in British Pat. No.: 1,247,674. A material having satisfactory properties for some applications can consist only of the silica-aerogel particles, or of the particles and one of the opacifier and the reinforcement. The term silica-aerogel particles is deemed to include microporous open lattice silica structures generally having a small particle size of the order of 100 millimicrometers or less.

For a number of applications, it is not possible to form a block confined in an envelope, particularly where the requisite shape is complicated and, while flat surfaces can be easily covered, curved or undulating surfaces cause some difficulty. Complicated shapes are sometimes required to accommodate ducting or electrical connections to and from the region which is to be isolated. Adhesive coatings can be used or strips of material otherwise adhered but, because of the inherent dampness of many adhesives, the adjacent insulation material can be broken down by the moisture content and the bond substantially weakened. Satisfactory application of such coatings is time-consuming and costly and the difficult nature of the operation means that very close tolerances cannot always be met and some shapes cannot be properly protected.

Another thermal insulation material is known which has a similar composition to that described above but includes a binder for the components of the mixture. While as a consequence, the consistency of a block formed therefrom is less powdery, because the quantity of binder is always kept to a minimum to minimise the loss of insulating properties, similar problems to those set out above do arise.

SUMMARY OF THE INVENTION

It is known that the particles of an insulation material of the above kind will fuse at temperatures of the order of 1500° C. and we have found that by using a laser, intense heat may be applied to the material which is sufficient to fuse only a thin surface layer of microporous insulation material to form a protective skin. Accordingly, the invention provides a method of forming a protective skin on the surface of a block of microporous insulation material comprising passing a laser beam across the surface to fuse the particles of the material at the surface.

A protective skin can be formed in the microporous material simultaneously with utilising the laser beam to cut a profile in a workpiece. Thus, the invention also provides a method of shaping blocks of microporous thermal insulation material wherein the desired shape is cut from a workpiece using a laser beam.

We have found that the use of a $CO_2$ laser in methods of the invention forms a highly satisfactory protective skin. Suitable lasers are 250 and 500 watt $CO_2$ gas lasers available from Messer Griesheim GmbH., of D-6000 Frankfurt/Main 1, West Germany, under the identification GL250 and GL500. A cutting gas is normally employed but is not essential as the microporous material contracts to around 10% to 15% of its original volume when it fuses.

The skin formed provides substantial protection and is not easily chipped or cracked. Its thickness depends essentially upon the dwell time of the laser beam against the surface and hence, on the rate of movement of the beam across the surface or through a workpiece. Particularly where it is used for cutting, it will be appreciated that the thickness of the workpiece is also a factor, the skin being thicker adjacent the face nearer the laser source.

The microporous thermal insulation material referred to above comprises predominantly silica-aerogel particles with relatively minor (by volume) amounts of opacifier and fibre reinforcement. The preferred opacifier is Titanium dioxide and the preferred reinforcement is Alumino-silicate fibres. Typical compositions conform to the following preferred criteria, the most preferred ranges being included in parenthesis

|  | % by weight |
| --- | --- |
| Silica-Aerogel | 50–97 (60–73) |
| Reinforcing fibre | 1–10 (2–7) |
| Opacifier | 2–40 (25–40) |

A specific composition has 63% by weight silica-aerogel particles; 32% by weight rutile (opacifier); and 5% by weight ceramic fibres. Suitable aerogel particles are available from Degussa GmbH., under the Trade Name AEROSIL, under the Trade Name CABOSIL from Cabot Corporation, or under the Trade Name SANTOSEL from Monsanto. The other components are also readily available.

In methods according to the invention, when the laser beam cuts through the workpiece or passes over an exposed surface of the block, the heat generated fuses the adjacent particles of the material to form the skin. The bulk of the skin will comprise fused silica particles by virtue of their predominant presence, but variations in the texture of the skin are likely to occur as the heat of the beam fuses any other component in its path. When the material comprises only aerogel particles, the only variation will be substantially uniform across the thickness of the workpiece or block for the reason given above. When other components are included, the dissipation of heat from the laser beam can vary slightly, resulting in concentrations across the surface of the skin. However, the amount of heat dissipated will always be low because of the low conductivity of the material being treated.

The method of the invention has an additional advantage where the workpiece is provided with a protective cover layer which has also to be cut or at least secured adjacent the protective skin. A typical such cover layer is a woven fibreglass fabric such as may be used in a material produced in accordance with our British Pat. No.: 1,247,674 referred to above. As the workpiece is cut, so is the cover layer or envelope which fuses with the microporous material. Thus, a workpiece originally provided with a protective cover layer remains protected by a substantially continuous protective surface after cutting in accordance with the present invention.

The movement of the laser beam through a workpiece can be controlled by a predetermined programme and automatically positioned. This enables identical products to be mass produced with great accuracy.

Forming blocks of microporous insulation material with a protective skin according to the invention substantially reduces manufacturing costs and renders it economic to produce blocks in complicated shapes for the mass market at a much reduced price. The high performance of microporous insulation material relative to heretofore more easily manufactured products renders it highly attractive to certain applications where high temperatures of the order of 1100° C. must be withstood and space is limited. By the present invention, the smaller space requirements of microporous thermal insulation material can be fully exploited.

BRIEF DESCRIPTION OF THE DRAWINGS

The invention will now be described by way of example and with reference to the accompanying drawings wherein:

FIG. 5 is a graph relating the rate at which the laser beam moves relative to the workpiece to the thickness of the workpiece to achieve the formation of a satisfactory skin.

As shown in FIG. 1, a $CO_2$ gas laser cutting tool suitable for carrying out the method of the invention comprises a resonator 2 cantilevered from a cabinet 4, and a cutting head 6. The operation of the tool will not be described in detail as such apparatus are known. Broadly though, the beam is generated in the resonator 2 and emitted vertically downwards form a cutting nozzle 8 mounted on the head 6. The components of the laser are controlled from a panel 10 mounted adjacent the resonator 2. The cutting head is suspended over a table 12, movably mounted on a block 14. In use, a workpiece comprising microporous thermal insulation material, normally in the form of a plank 16 is secured on the table 12, the laser energised, and the table moved to pass the workpiece 16 through the emitted beam to cut the desired shape, for example along line 18. The movement of the table is normally controlled by a computer 20 to follow a predetermined path, enabling the production of a plurality of identical shapes from one or a number of workpieces. It is sometimes possible to hold the workpiece stationary and move the laser cutting head 6 by means of a guiding machine coupled to the resonator 2, or to move the workpiece relative to the table, but the described method is preferred. The table presents a broken surface to the beam and is for example, in the form of a metal honeycomb. The nature of the surface is not critical, although reflection is best avoided to minimize dissipation and energy wastage.

Figure 1:
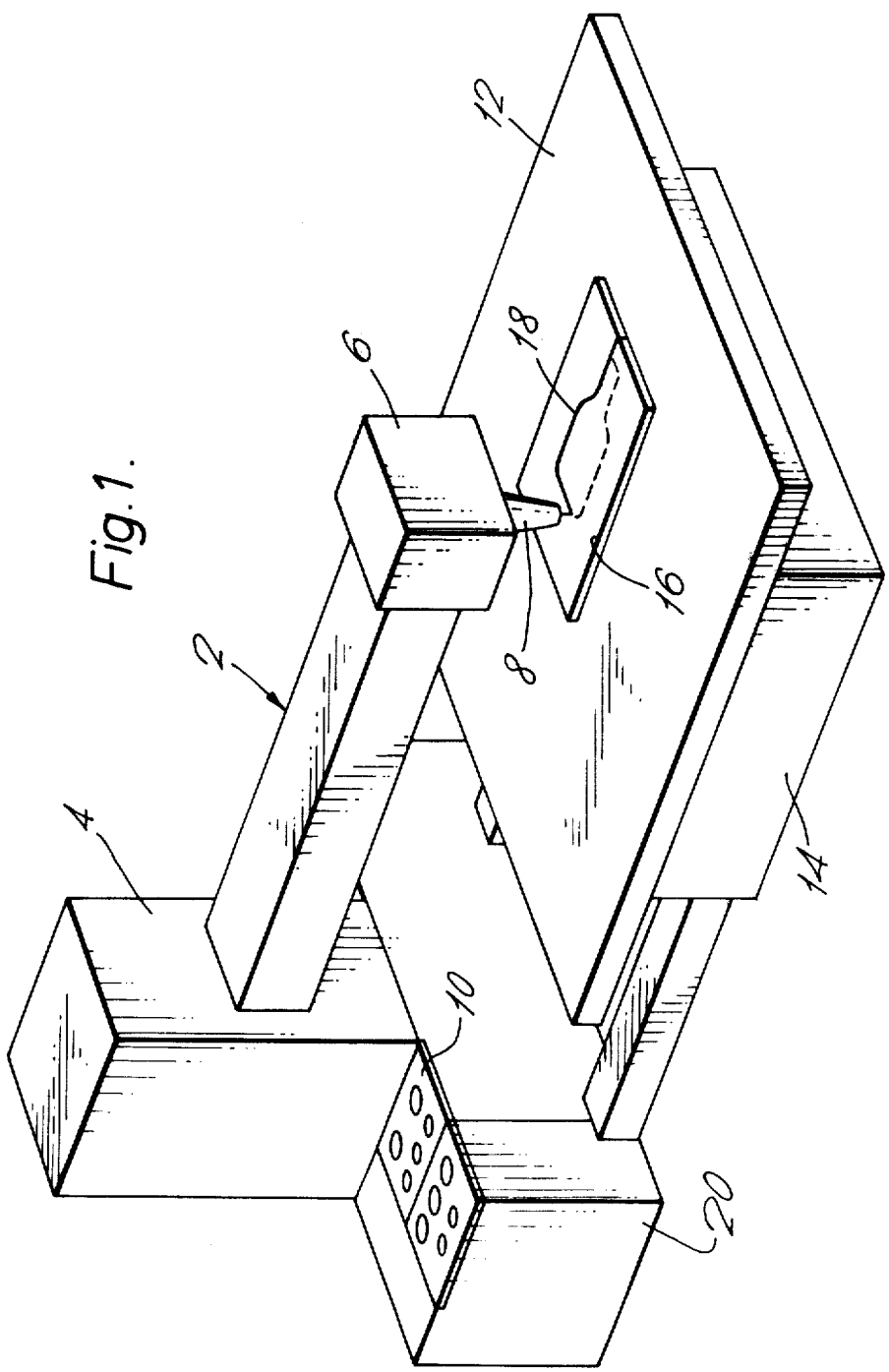
FIG. 1 is a schematic perspective view of apparatus used in carrying out the method of the invention.
Figure 2:
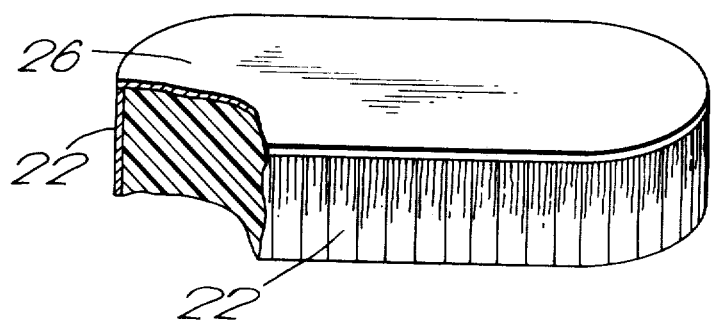
FIG. 2 is a schematic perspective view, partially in section, of a block of insulation material having a skin formed around the periphery thereof in accordance with the invention.
Figure 3:
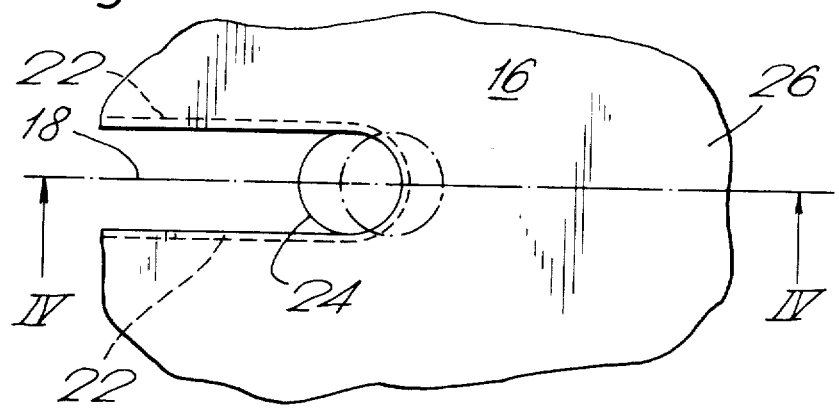
FIG. 3 is a much enlarged schematic sectional view showing the passage of the laser beam through a workpiece to form the block of FIG. 2.
Figure 4:
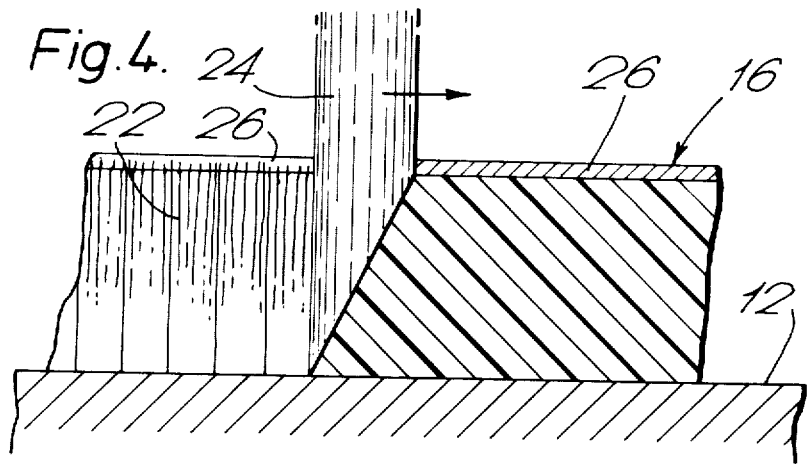
FIG. 4 is a section taken on line IV—IV of FIG. 3.

As the workpiece moves through the beam the desired shape is formed and simultaneously, a skin of fused insulation material is formed at the cut edge. This is illustrated in FIGS. 2, 3 and 4. The formed block shown in FIG. 2 has a skin 22 which is more dense adjacent the upper surface, as indicated by the differential shading. This is because, as illustrated in FIGS. 3 and 4, the upper portions of the cut are exposed to the lower beam 24 for a greater duration than the lower portions. As the beam 24 moves through the workpiece it impinges on the upper portions first, causing the particles in this region to fuse and thus shrink against adjacent unfused portions. Progressively, the beam 24 penetrates to the lower portions where there is proportionally less energy available from the beam because some is absorbed into the already fused particles. It is therefore important to regulate the relative movement of the beam and workpiece to ensure that a satisfactory skin is formed. It can sometimes be advantageous to oscillate the beam or workpiece to improve the uniformity of the skin density across the cut, or to alter the angle of the cutting head 6, but we have found this to be unnecessary for workpieces of normal size; i.e., of the order of 25 mm thick. The creation of a slightly corrugated skin does though, result in greater strength, and this can be achieved by intermittent or discontinuous movement of the beam relative to the workpiece. Such deliberate movement of this kind is not always necessary as a degree of corrugating tends to develop in any event.

The shrinkage of the insulation material as it fuses to form the skin has the advantage that very little if any residue is formed which has to be disposed of. Upon fusing, the material contracts to substantially 10% to 15 % of its original volume and in practice we have found that the skin is firmly bonded to the unfused material which supports it. The low thermal conductivity of the material and its high volume of voids ensures that the skin formed is extremely thin, only material in the immediate vicinity of the beam being fused, and fills the voids in the otherwise raw edge that would result if the workpiece were cut by other means, binding the unfused particles.

The block shown in FIG. 2 is cut from a workpiece made in accordance with our British Pat. No.: 1,247,674 and has a covering 26 of fibreblass fabric. The head of the laser beam 24 also serves to fuse the fabric at the cut edge, making it integral with the skin 22. Thus, a block cut in accordance with this invention from an encapsulated workpiece of this kind has a continuous protective layer over its entire surface. This enables a block to be cut at an edge of such a workpiece, or from a central region, in which latter case, the fused skin is continuous about the periphery.

It will be appreciated that a protective skin may also be formed in accordance with the invention by passing the laser beam around the periphery of an already cut block. This is sometimes suitable for specific applications but in general, it is more practical to cut the block and form the skin simultaneously.

FIG. 5 shows graphs of workpiece thickness plotted against cutting speed using a GL250W and a GL500W $CO_2$ gas laser cutting tool available from Messer Griesheim GmbH. As can be seen, a higher cutting speed can always be achieved using the more powerful laser (line 26) although for the thicker workpieces the difference is less pronounced. In percentage terms however, the difference is relatively constant, a 55% to 60% improvement being available with the more powerful tool. The tests upon which these graphs are based all used a cutting gas, but as no combustion takes place, only marginal variations corresponded to a change of gas ($N_2$, $O_2$ or air). As is apparent from FIG. 4, the optimum cutting speed will be that at which substantially all the energy of the laser beam is consumed during its passage through or across the workpiece or block.

I claim:

1. A method of shaping a block of microporous thermal insulation material comprising silica-aerogel particles while simultaneously forming a protective skin on said material, said method comprising cutting the desired shape from a workpiece using a laser beam, wherein the laser beam is directed at the workpiece so as to cut the workpiece and simultaneously to generate intense heat sufficient to fuse the silica-aerogel particles at the surface of the cut edge, thereby forming a thin, substantially continuous protective skin at the cut edge of the shaped block.

2. A method according to claim 1, wherein the workpiece is provided with a protective layer of material on the surface thereof adjacent to the cut to be made, and wherein the laser beam integrally joins the protective layer to the protective skin along the cut edge as the protective skin is formed.

3. A method according to claim 2, wherein the protective layer of material comprises a porous envelope.

4. A method according to claim 3, wherein the thermal insulation material further comprises fibrous reinforcement and an opacifier, the insulation material being mixed and subsequently compressed within the porous envelope.

5. A method according to claim 1, wherein the thermal insulation material further comprises fibrous reinforcement and an opacifier, the insulation material being mixed and subsequently compressed to form a solid block.

6. A method according to claim 1, wherein the laser beam is provided by a $CO_2$ laser.

7. A method according to claim 1, wherein the movement of the laser beam relative to the workpiece is controlled automatically.

8. A method according to claim 7, wherein the movement of the laser is effected in accordance with a predetermined program enabling the mass production of identically shaped blocks.

* * * * *